United States Patent [19]
Diffenderfer

[11] 4,009,867
[45] Mar. 1, 1977

[54] SPRING COMPRESSOR

[75] Inventor: Walter L. Diffenderfer, Lancaster, Pa.

[73] Assignee: K-D Manufacturing Company, Lancaster, Pa.

[22] Filed: Apr. 26, 1976

[21] Appl. No.: 680,157

[52] U.S. Cl. .................................. 254/10.5; 29/227
[51] Int. Cl.² ........................................ B23P 19/04
[58] Field of Search ............. 254/10.5; 29/215–218, 29/225–227

[56] References Cited
UNITED STATES PATENTS

| | | | |
|---|---|---|---|
| 3,814,382 | 6/1974 | Castoe | 254/10.5 |
| 3,902,698 | 9/1975 | Furrer et al. | 254/10.5 |

Primary Examiner—Al Lawrence Smith
Assistant Examiner—Robert C. Watson
Attorney, Agent, or Firm—Paul & Paul

[57] ABSTRACT

A spring compressor especially adapted for use with MacPherson strut assemblies. Two parallel end plates having apertures sized to allow the insertion of the tubular shock assembly of the MacPherson strut assembly engage the housings containing the ends of the spiral spring of the strut assembly. The two end plates are joined by threaded support rods which allow the perpendicular distance between the two end plates to be varied to compress the spring as desired. Pivoted latches allow the quick insertion or removal of the MacPherson strut assembly from the spring compressor. Quick release safety catches lock the latches to their respective end plates, to hold the strut assembly securely while the spring is compressed.

5 Claims, 11 Drawing Figures

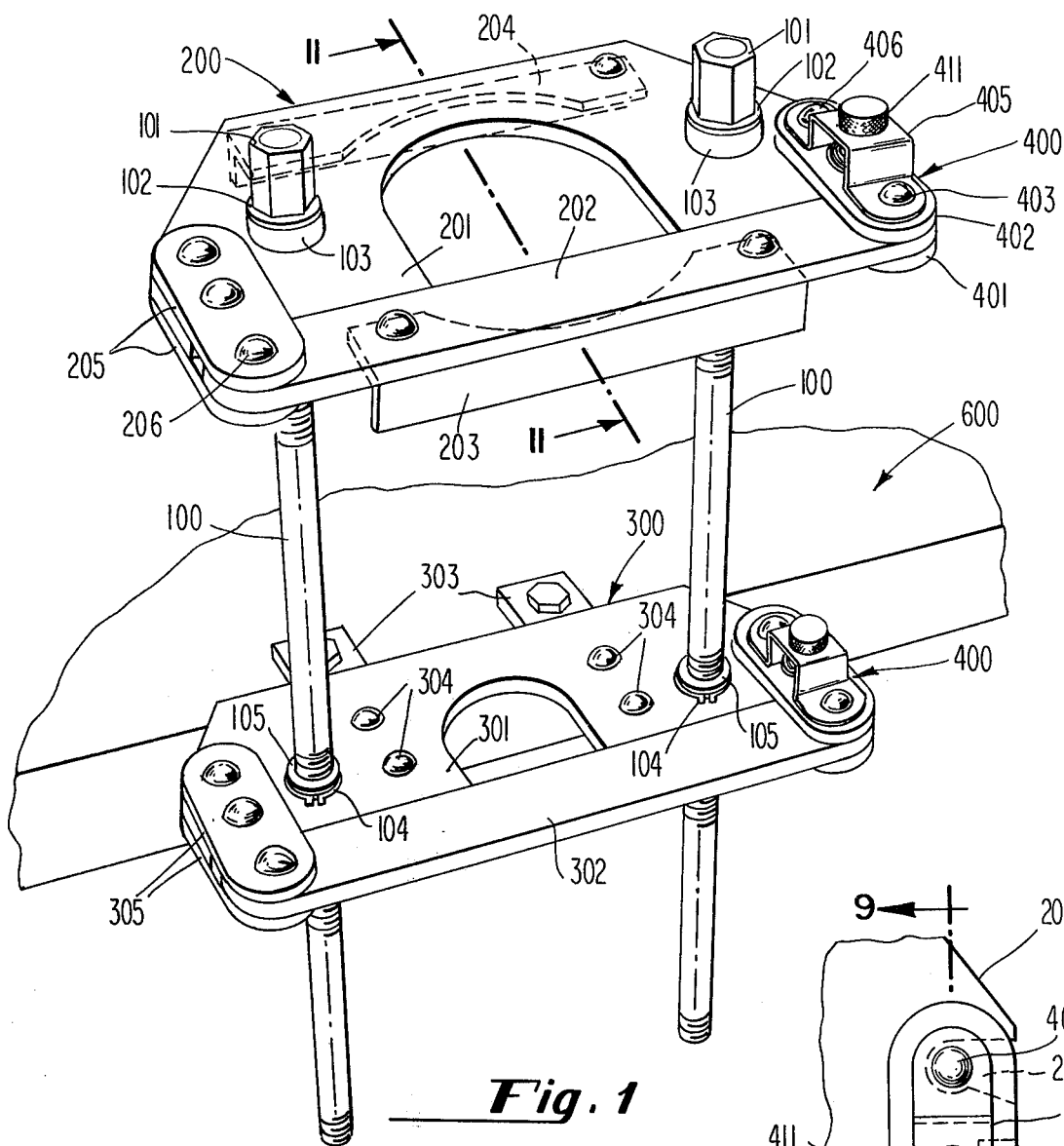
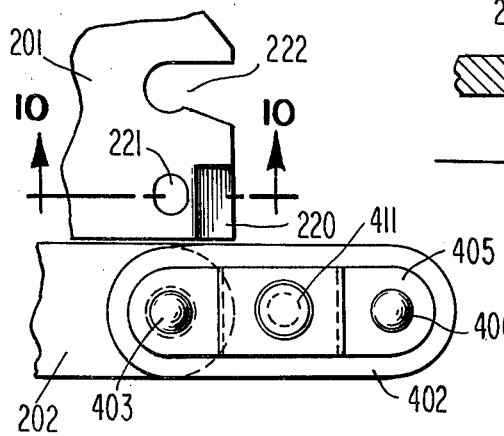
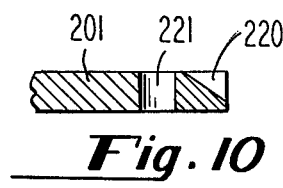
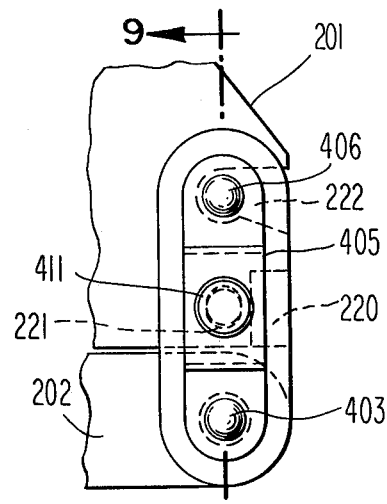
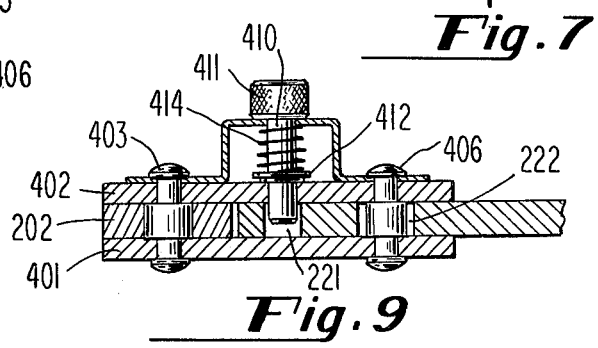

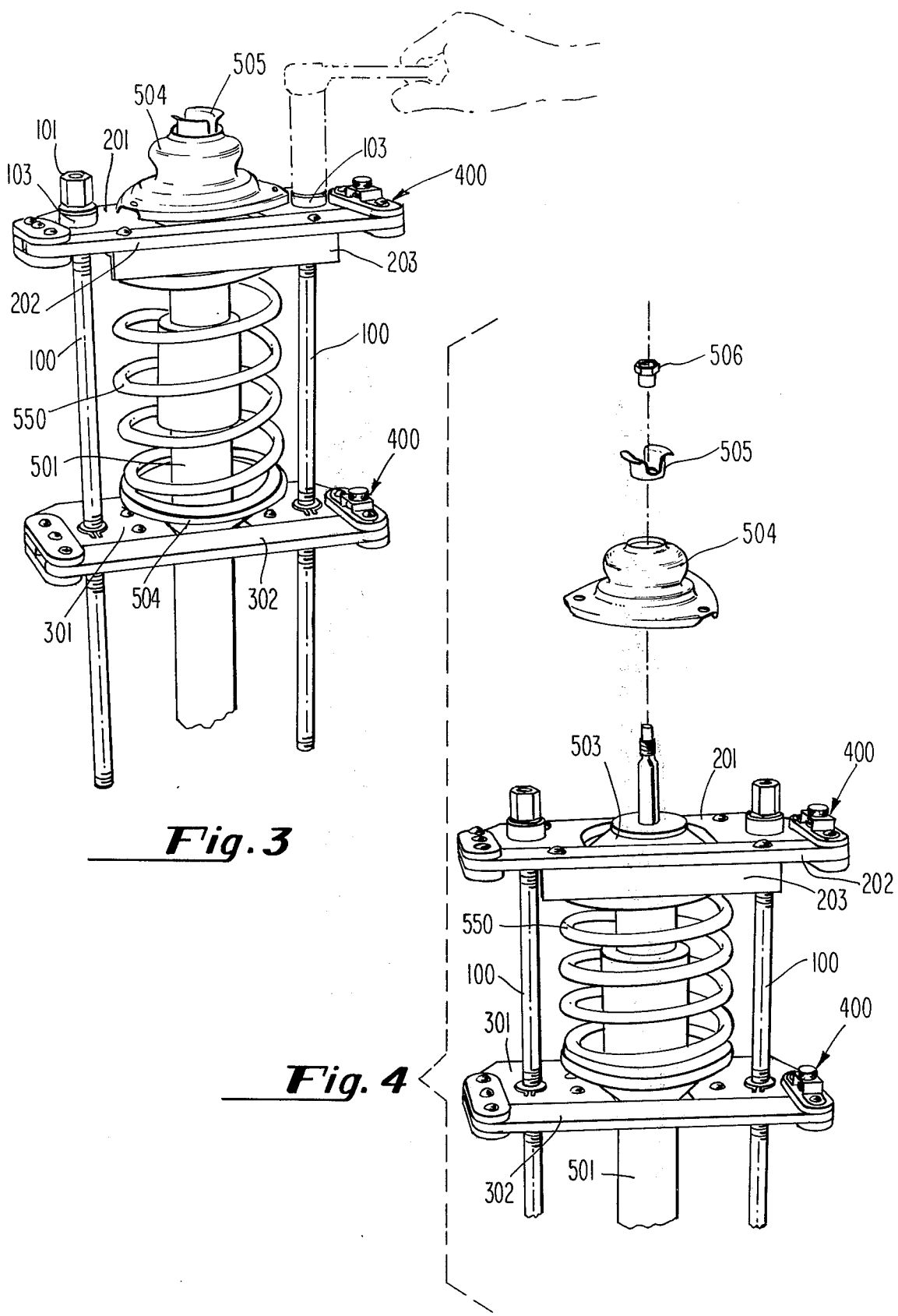

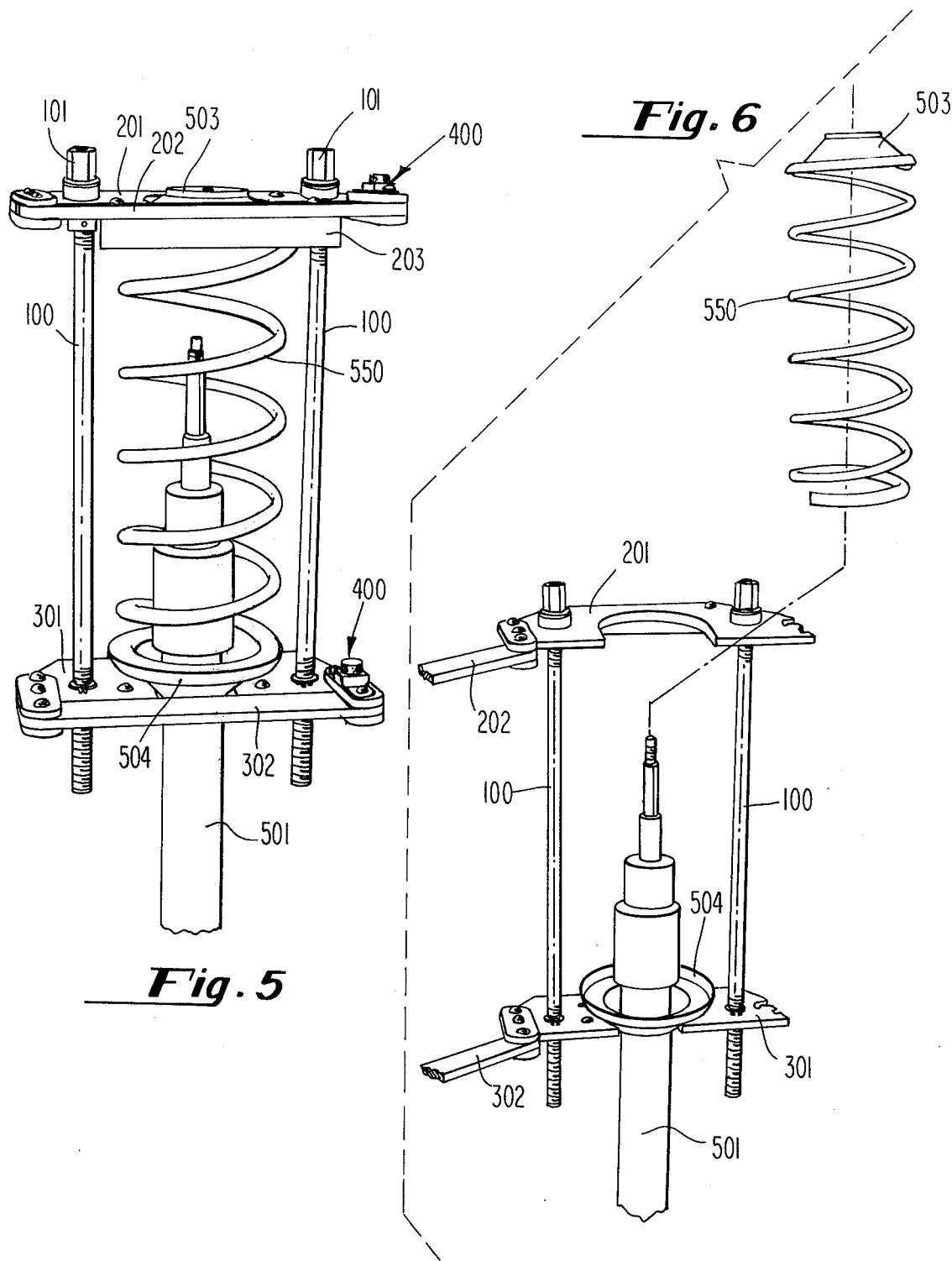

SPRING COMPRESSOR

BACKGROUND AND SUMMARY OF THE INVENTION

This invention relates to a spring compressor especially adapted for use with MacPherson strut assemblies and shock overload spring assemblies.

More specifically, the invention relates to a spring compressor apparatus wherein a spring assembly to be compressed is positioned on the frame and a movable end plate assembly applies a compressive force upon the spring. The design of the invention permits the rapid operative positioning of the spring to be compressed into the device to achieve efficient compression thereof. The apparatus further includes quick release safety catches to ensure the secure positioning of the spring to be compressed within the device, and end plate engaging projections to secure the ends of the spring against sideways motion while the spring is being compressed.

Although not intended to be so limited, the spring compressor apparatus is described for use in conjunction with an automotive shock absorber or suspension system. In the service and repair of certain types of shock absorbers and suspension systems it is necessary for a mechanic to compress the spring of the system in order to be able to release the pressure or bias on bolted members which must be removed in order to repair or otherwise service the assembly. Generally, the suspension system or shock is removed from the automobile and a force is applied to the springs so that the system may be disassembled for various repairs and service.

Prior art devices, such as those taught in U.S. Pat. No. 3,814,382 and U.S. Pat. No. 3,902,698 disclose various devices which could be used to compress the spring of an automotive shock absorber or suspension systems. However, these devices are heavy and bulky and utilize hydraulic or pneumatic actuation which is inherently dangerous in that safety latches must be incorporated to prevent the sudden dangerous expansion of a compressed spring in the event of a hydraulic or pneumatic failure.

Accordingly, it is a primary object of this invention to provide a simple, light-weight, inexpensive safe apparatus to compress automotive shock assembly springs.

It is another object of this invention to provide an apparatus for compressing springs which requires no external power source, other than a wrench.

It is another object of this invention to provide an apparatus for compressing springs which is so designed that the spring to be compressed can easily be inserted into or withdrawn from the spring compressing apparatus.

These and other objects are obtained in accordance with the present invention wherein there is disclosed an improved spring compressor apparatus for compressing a spring such as in a shock or suspension system of a vehicle. The improved spring compressor herein disclosed permits an operator to readily and quickly mount an automotive vehicle spring assembly to be compressed into the spring compressor in a manner that repairs or other service of the assembly is easily achieved.

The novel apparatus includes a movable latch assembly which is held in place by quick release safety catches. The force to compress the spring is applied by two parallel end plates each of which has an aperture which allows the shock absorber portion of the vehicle spring assembly to protrude through the end plate, allowing the end plates to exert a force upon the ends of the spring. The perpendicular distance between the end plates is varied by rotating support rods which ride in bearings in one end plate and are threaded into threaded apertures in the other. This design is inherently safe, as distinguished from the other systems which would use either a hydraulic or pneumatic force actuating mechanisms, since it is not possible to lose the spring-compressing force suddenly. The design of the novel spring compressor herein disclosed permits an operator to safely attach a spring assembly without the necessity of clamping the assembly to the apparatus. Accordingly, the invention achieves efficient compression of the springs with an apparatus which is simple in design, inexpensive to manufacture, and inherently safe.

BRIEF DESCRIPTION OF THE DRAWINGS

Further objects of this invention, together with additional features contributing thereto and advantages accruing therefrom, will be apparent from the following description of the invention when read in conjunction with the accompanying drawings wherein:

FIG. 1 is a perspective view of the spring compressor attached to a work table.

FIG. 3 shows the shock absorber assembly mounted in the spring compressor and partly compressed.

FIG. 4 is an exploded perspective view of the spring compressor fully compressed with the retaining hardware of the shock absorber assembly removed.

FIG. 5 is a perspective view of the spring compressor unit having the spring fully extended.

FIG. 6 is an exploded perspective view showing the spring removed.

FIG. 7 is a fragmentary plan view of the quick release mechanism of the device, showing the quick release links in the locked position.

FIG. 8 is a fragmentary plan view of the quick release mechanism in the unlocked position.

FIG. 9 is a sectional view taken along lines 9—9 of FIG. 7.

FIG. 10 is a fragmentary sectional view taken along lines 10—10 of FIG. 8.

DESCRIPTION OF THE PREFERRED EMBODIMENT

Figure 2:
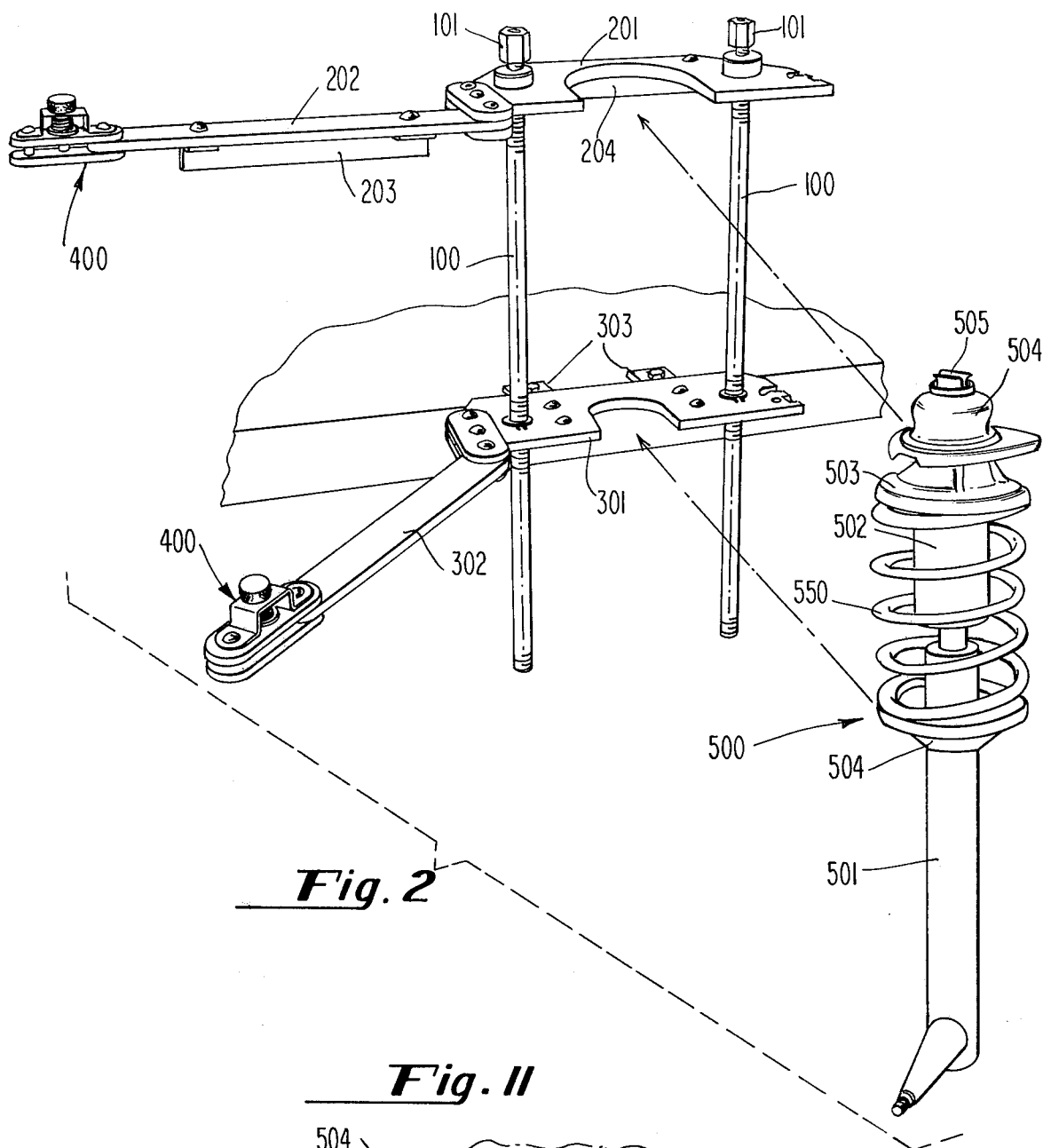
FIG. 2 is an exploded view showing the spring compressor in the open position ready to receive the shock absorber assembly.

FIG. 1 is a perspective view of the spring compressor attached to a work table 600 by brackets 303 which are bolted to the bottom end plate 301 as shown. While it is convenient to mount the spring compressor assembly as shown this is not essential and it is possible to use the spring compressor without mounting it to any support. The spring compressor can be fabricated of steel, or any other suitable metal.

The two end plates 201 and 301 are connected by two threaded rods 100. Rods 100 ride in bearings 103 in end plate 101 as shown and are threaded into threaded bushings 105 secured by O rings 104 on the top and bottom of end plate 301. Bushings 105 are constrained against rotation by a keyway or other conventional means.

Shank means 101 are welded on the end of each rod 100 as shown to allow the rod to be rotated by application of an external torque provided by a manual or powered tool as shown in phantom in FIG. 3. Washers 102 are provided between the shank means 101 and bearing means 103.

Each end plate has an aperture as shown sized to accommodate the shock absorber portions of the MacPherson strut assembly 500. Pivotal latches 202 and 302 are pivotally mounted at 206 and 306 respectively to end plates 201 and 301. As illustrated in FIG. 1 the latches are in the closed position and secured by quick release assembly 400.

Figure 11:
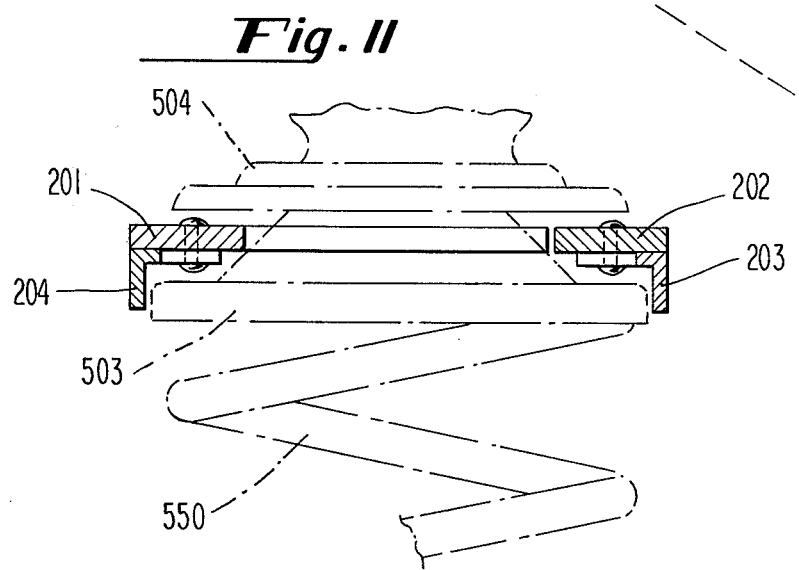
FIG. 11 is a sectional view taken along line 11—11 of FIG. 1.

FIG. 2 illustrates the spring compressor in the open position ready to receive a MacPherson strut assembly 500. Latches 202 and 302 have been swung back to allow the insertion of assembly 500 into the apertures of the end plates as shown. The apertures in end plates 201 and 301 are sized to allow portions 501 and 502 of assembly 500 to extend through the respective end plates, as shown. The housings 503 and 504 containing the ends of spiral spring assembly 500 are held securely between the end plates as shown in FIG. 3. The housing 503 containing the top of spring 550 fits directly against the inner faces of end plate 201 and latch 202 as shown in FIG. 11. Angle irons 203 and 204 prevent the housing 503 from sliding out of engagement with end plate 201 and latch 202 while being compressed.

The bottom end of the MacPherson strut assembly 500 extends into the aperture in end plate 301 such that the body portion of the MacPherson strut assembly 504 engages end plate 301 as shown in FIG. 3.

Quick release catches 400 secure latches 202 and 302 respectively to end plates 201 and 301. The quick release catches operate as follows: (See figures 8 and 9). To release the catch, plunger 410 is lifted against spiral spring 414 until the engagement end of the plunger clears plunger aperture 221. The quick release catch assembly 400 is then free to pivot clockwise about pivot 403 freeing latch 202 to pivot clockwise about pivot 206 opening the aperture of the spring compressor device. The quick release catches are secured as follows: Latch 202 is pivoted counterclockwise until it abuts end plate 201. This is the closed position of latch 202. Quick release catch 400 is rotated counterclockwise into engagement with end plate 201. As this rotation is nearly completed cam surface 220 engages the extended plunger 410 lifting the plunger up against spring bias 414. When plunger assembly 410 is centered over aperture 221 spring 414 automatically extends the plunger and locks the quick release mechanism in place. Rivet 406 engages keyway 222 in end plate 201 as shown to ensure that the plunger is properly centered for automatic engagement, and to provide additional strength in the locked position. FIGS. 8 and 10 illustrate cam surface 220 used to automatically retract plunger 410. The quick release catches disclosed herein allow the operator of the spring compressor to use the disclosed apparatus quickly and easily with complete safety.

The operation of the spring compressing unit is as follows:

The spring compressor assembly is preferably mounted to a work table as shown in FIG. 2. Latches 202 and 302 are opened to permit the MacPherson strut assembly 500 to be inserted into the apertures in their respective end plates as shown. Latches 202 and 302 are then closed over the MacPherson strut assembly 500 as shown in FIG. 3. Quick release catches 400 are used to secure the latches in place as described above. The insertion of the MacPherson strut assembly into the spring compressor can be accomplished very quickly without the necessity for attaching any safety catches or retaining hardware often required by the prior art.

After the MacPherson strut assembly has been placed in the spring compressor as shown in FIG. 3 rods 100 are rotated either manually or with a power-driven tool to move the end plates closer together, compressing spring 500. The length of the respective rods 100 is kept approximately equal during this process by either simultaneously rotating the two rods at the same speed, or by alternately rotating the rods through small increments, to ensure that the end plates remain essentially parallel.

As end plates 201 and 301 are moved towards each other spring 550 is compressed as shown in FIGS. 3 and 4. When the spring has been compressed as shown in FIG. 4 it is then possible for the mechanic to remove the assembly hardware 504, 505 and 506 from the end of the MacPherson strut assembly. After this hardware has been removed rods 100 on spring compressor unit are rotated in the opposite direction to remove the compression from the spring as shown in FIG. 5. Latches 202 and 302 can then be opened, as described above, and the spring of the MacPherson strut assembly removed as shown in FIG. 6. After the necessary repairs have been completed the mechanic can reinstall the spring by reversing the above procedure.

The use of threaded rods 100 in the spring compressor apparatus offers unique safety advantages in that the spring compressing force (which can be substantial) can only be released by rotating the rods. Other spring compressor designs which utilize pneumatic or hydraulic units to apply the force must incorporate safety catches to prevent sudden motion of the spring in the event of a loss of hydraulic or pneumatic power.

The spring compressor herein disclosed is simple, inexpensive, and easy to manufacture, while being safe and easy to operate.

Although the invention has been described with reference to a preferred embodiment it will be understood by those skilled in the art that various changes may be made and equivalents may be substituted for the elements thereof without departing from the true spirit of the scope of the invention. In addition, many modifications may be made to adapt a particular situation or material to the teaching of the invention without departing from its essential teachings.

What is claimed is:

1. A spring compressing unit for use with a MacPherson strut assembly comprising:
    a. Two parallel end plates adapted to securely engage the housing containing the ends of the spiral spring of the MacPherson strut assembly, wherein apertures in said end plates allow the tubular shock assembly of said MacPherson strut assembly to extend through and beyond said end plates;
    b. Support means joining the two end plates adapted to vary the perpendicular distance between the two end plates to compress the spring as desired;
    c. Latch means to secure the MacPherson strut assembly in place pivotally mounted on each end plate comprising a latch having a pivotal end and a free end and a pivotal mounting securing the latch to the end plate in such a manner that one side of the aperture in the end plate is formed by the inner edge of the latch when the latch is in the closed position;

d. A quick release catch on the free end of the latch assembly adapted to securely hold the free end of the latch assembly to the end plate when the latch assembly is in the closed position.

2. The apparatus of claim 1 wherein the support means joining the two end plates comprise:

a. A plurality of bearing means in a first end plate;

b. A plurality of threaded apertures in the second end plate;

c. A plurality of rods extending perpendicularly through the end plates, said rods being adapted to bear in the bearing means of the first plate and to thread into the threaded apertures of the second plate;

d. Shank means on the rods to allow the rods to be rotated by an external tool.

3. The apparatus of claim 2 wherein the shank means is a hexagonal nut.

4. The apparatus according to claim 1 wherein one of the two end plates has a plurality of L-shaped members secured to it such that projections extend towards the other end plate, said projections being adapted to prevent the housing with the spiral spring of the MacPherson strut assembly from slipping out of engagement with the end plate while the spring is being compressed.

5. The apparatus according to claim 2 wherein each quick release catch comprises:

a. Two parallel links having first and second ends said first ends being copivotally mounted on opposite sides of the free end of the latch, said second ends being maintained in spaced parallel relation by a rivet;

b. A plunger aperture in the middle of the first link;

c. A plunger having an engagement end and a second end said plunger extending perpendicularly through the plunger aperture such that the engagement end of the plunger extends beyond the plane of the first link in the direction of the second link when in the engaged position, and wherein the engagement end of the plunger is within the plane of the first link when in the retracted position;

d. Plunger support means on the first link maintaining the plunger in fixed axial relation to the plunger aperture;

e. Spring means biasing the plunger to the extended position;

f. A knob on the end of the plunger opposite the engagement end to allow manual retraction of the plunger;

g. A plunger aperture in the end plate to receive the plunger and lock the links and latch against pivotal motion;

h. A cam surface on the end plate adjacent to the plunger aperture to move the plunger into the retracted position as the links are pivoted into the closed position so that the spring biasing means will automatically force the engagement end of the plunger into the plunger aperture when the links reach the fully closed position;

i. A slot in the end plate adapted to receive the rivet which joins the first and second links when the links are pivoted into the closed position.

* * * * *